Sept. 15, 1925 Re. 16,167

G. FRINK

CABLEWAY CARRIAGE

Original Filed June 2, 1921

Inventor

Gerald Frink

By H. L. & G. L. Reynolds

Attorneys

Reissued Sept. 15, 1925. Re. 16,167

UNITED STATES PATENT OFFICE.

GERALD FRINK, OF SEATTLE, WASHINGTON.

CABLEWAY CARRIAGE.

Original No. 1,445,013, dated February 13, 1923, Serial No. 474,492, filed June 2, 1921. Application for reissue filed September 24, 1924. Serial No. 739,718.

*To all whom it may concern:*

Be it known that I, GERALD FRINK, a citizen of the United States of America, and resident of the city of Seattle, in the county of King and State Washington, have invented certain new and useful Improvements in Cableway Carriages, of which the following is a specification.

My invention relates to cableway systems and carriages therefor, and particularly to cableways such as are used in logging.

The chief object of my invention is the provision of means whereby a running hoist line in its passage through the carriage and the fall block will at all times be bent in one direction, thereby avoiding alternate bending of the hoist line in opposite directions and reducing the internal friction and wear in such cables.

In the accompanying drawings I have shown my invention in forms of construction which will illustrate the principles thereof.

Figure 1:
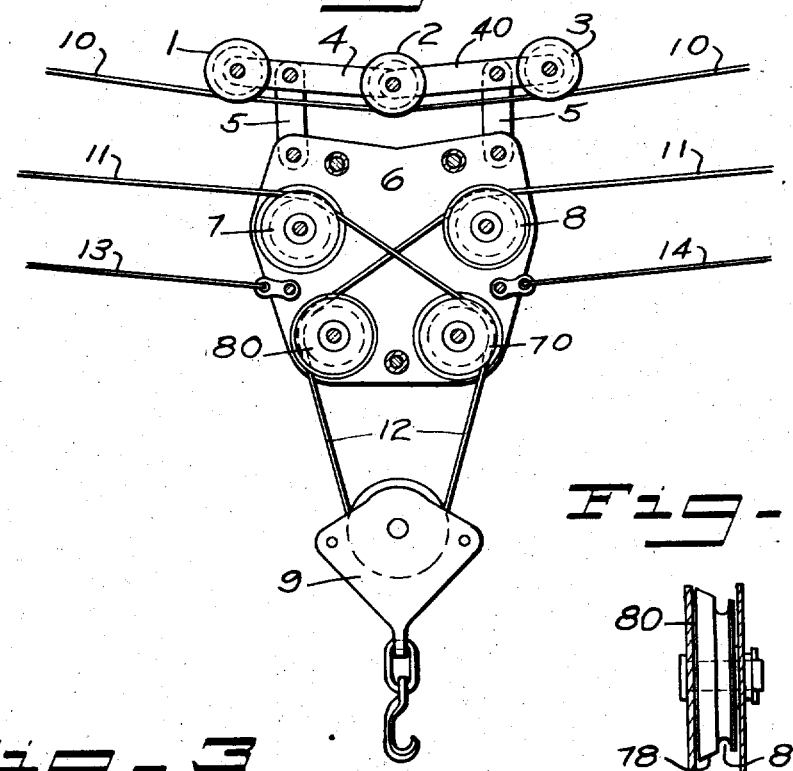
Figure 1 shows a cableway carriage having my invention embodied therein, one side plate being removed to better show the position and relation of the wheels.
Figure 2:
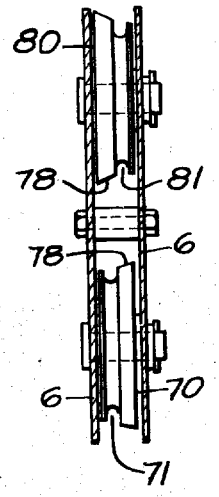
Figure 2 is a horizontal transverse section through that part of the carriage containing the hoist rope pulleys.

So far as the novel features of my invention are concerned, the carriage may be constructed in any suitable manner, and likewise may be supported and controlled in any suitable manner, it being immaterial to the principal feature of my invention how the carriage is constructed or traversed, but in Figure 1 for convenience I have shown a carriage, which may consist of side plates 6, suitably joined, as supported upon a trackway cable 10 by means of trackway sheaves 1, 2 and 3, mounted in arms 4 and 40, the carriage proper being suspended therebelow by means of links 5. In this form the haul-in line 13 and the back-haul line 14 both are shown as connected directly to the carriage, although this is a matter of choice and any convenient arrangement may be employed by means of which the carriage may be traversed along the line 10.

Figure 3:
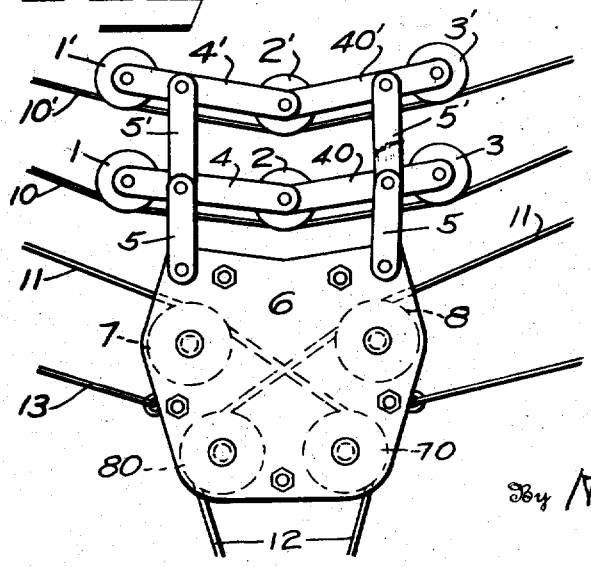
Figure 3 is a view similar to that of Figure 1, but modified to fit a double or looped main line or trackway cable.

In Figure 3 the trackway cable is shown as looped to provide a second run 10′, the carriage being supported from both of the lines 10 and 10′, as by the addition of sheaves 1′, 2′, and 3′, supported in arms 4′ and 40′, and these arms being connected through link 5′ with the arms 4 and 40 which carry the trackway sheaves 1, 2 and 3.

In the common type of carriage wherein the hoist line is a running line, that is, one which is secured at one end, and which passes through the carriage and has a hoist block, as 9, in the depending loop of the line, it passes about two such pulleys, as 7 and 8, positioned in a common plane, and between these about the hoist block 9, thus bending the line three times in successively opposite directions. Such opposite bending of the line is much harder upon it, producing much greater internal friction than where the bending is all in the same direction.

Instead of following the above plan I provide means whereby the running hoist line is guided in such a way that in running through the carriage it crosses itself and is bent in only one direction.

In the form shown herein this is accomplished by the provision of two additional sheave wheels or pulleys, 70 and 80, the two parts of the running hoist line 11 crossing in their passage between the upper and the lower sheaves. By this expedient the bending of the line is everywhere in the same direction and also the angle of bend when passing about the sheaves in the carriage is reduced. To prevent friction between the two crossed parts of the rope, the sheaves 7, 70, 8 and 80 of the carriage are of double width, having the line-receiving grooves 71 and 81 at one side, the other side being provided with a flange 78, preferably slightly coned so as to deflect the line if it ever bears thereon, into the proper groove. The sheaves 7 and 70 have their grooves placed at one side of the carriage and the sheaves 8 and 80 at the opposite side. All these sheaves may be alike in construction, two being turned oppositely to the other two. By such an expedient the cross parts of the line 11 are prevented from rubbing together. In logging, operations, in which cableway carriages of the nature to which this invention relates, are used, it becomes necessary to lift very heavy loads and to cause them to traverse a trackway cable of great length. These trackway cables must frequently span relatively wide valleys between mountain sides. Consequently, it is of importance that the load be evenly balanced upon the carriage so that the latter will have no tendency to leave the trackway cable. To this end, all of the runs of the hoisting cable and its guides, within the carriage, should be maintained as nearly as possible in the vertical plane of the trackway cable. It will be observed that the present structure is admirably adapted to accomplish this result. The several pulleys 7, 8, 70 and 80 are all in the same vertical plane which is, in turn, the vertical plane of the trackway cable. The runs of the cable are offset only to the very slight extent necessary to permit them to cross without rubbing. I am enabled to dispose all of these guide pulleys in the same vertical plane and in substantially, vertical alinement with the trackway cable, by disposing them in spaced relation.

The essence of my invention is the guiding of a running hoist line so that it is bent in only one direction in passing through the carriage, thereby reducing the internal friction and wear in the cable to a minimum. The means illustrated for securing this are given to illustrate the principle, and not as the sole means whereby the desired result may be secured. The means shown herein for carrying out my invention consist chiefly in guide sheaves for the hoist line, so placed that the line in passing through the carriage may cross itself without interference. Any means for securing this result is deemed an equivalent of that shown.

What I claim as my invention is:

1. In a logging system, a suspended trackway cable, a carriage suspended therefrom and movable thereon, a running hoist line looped through the carriage between its ends and a plurality of guiding elements for guiding the hoist line within the carriage with all of the bends of the loop in the same direction, all of said guiding means being disposed in substantially the same vertical plane and in substantially the vertical plane of the trackway cable.

2. In combination, a traveling carriage, means for suspending said carriage for travel upon a cable, a running hoist line, a block in a loop of said line, a plurality of guide pulleys for said line all mounted in substantially the same vertical plane in the carriage, to guide the line to cross within the carriage with its bends always in the same direction, said pulleys being laterally spaced from each other and lying when the device is in use, in substantially the vertical plane of the trackway cable.

3. In a cableway, in combination, a trackway cable, a carriage suspended therefrom and provided with means to adapt it to travel thereon, hoist line sheaves mounted in said carriage at laterally separated points but all of the sheaves lying in substantially the same vertical plane, to permit crossing of the hoist line within the carriage, a hoist block and a running hoist line passing in succession over one of said sheaves over the hoist block and over another of the sheaves with its bends always in the same direction.

4. In a logging system, a suspended trackway cable, a carriage suspended therefrom, provided with means adapting it to travel there-along, a running hoist line looped through the carriage between its ends and means for guiding the hoist line within the carriage with all of its bends in the same direction, said guiding means being disposed materially below the point of suspension of the carriage upon the cable and being disposed in substantially the vertical plane of the trackway cable.

5. In a logging system, a suspended trackway cable, a carriage suspended therefrom provided with means adapting it to travel there-along, a running hoist line looped through the carriage between its ends and sheaves for guiding the hoist line within the carriage with all of its bends in the same direction, said guiding means being disposed materially below the point of suspension of the carriage upon the cable and being all disposed in substantially the vertical plane of the trackway cable and in laterally spaced relation with respect to each other.

6. A cableway carriage having four guide pulleys for a running hoist rope positioned to guide the rope coming from opposite sides to cross within the carriage.

7. A cableway carriage having four guide pulleys for a running line positioned at the corners of a quadrangle, the pulleys of two opposite corners having their line grooves offset towards one side of the carriage and those at the other opposite corners offset towards the other side of the carriage.

8. In combination, a cableway carriage, a running line, a block in a loop of said line, two pairs of guide pulleys for said line journaled in the carriage to guide the line coming from opposite sides of the carriage to cross and in laterally offset planes.

Signed at Seattle, King County, Washington, this 26th day of August, 1924.

GERALD FRINK.